March 10, 1959 W. J. KELLEIGH 2,876,882
CLUTCH ACTUATING DEVICE
Filed Sept. 16, 1954 2 Sheets-Sheet 1
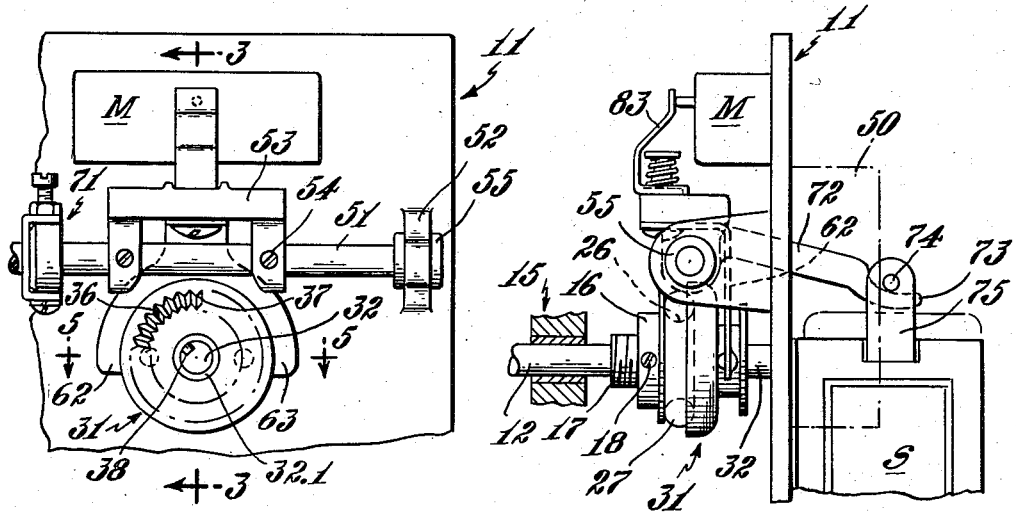
Fig.1
Fig.2
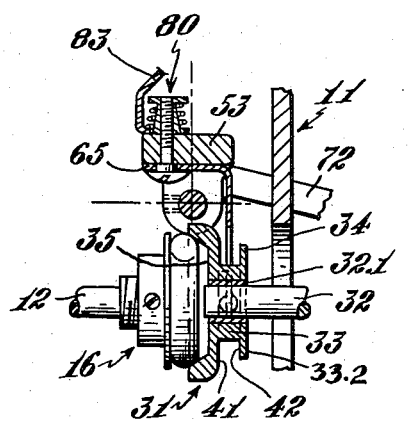
Fig.3
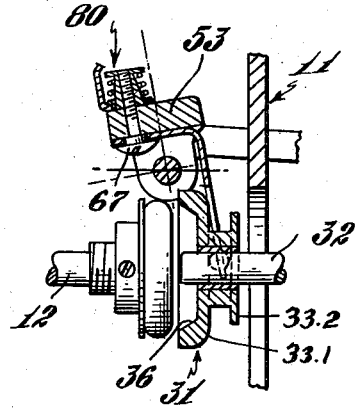
Fig.4
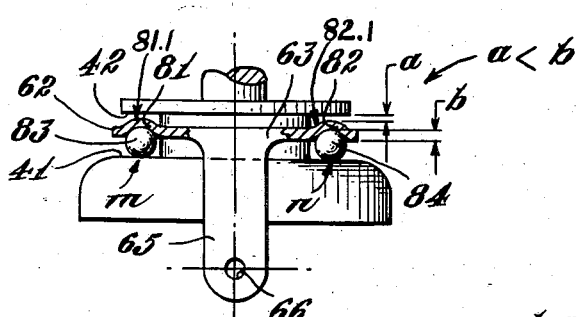
Fig.5
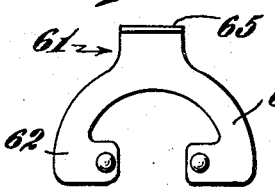
Fig.6
Inventor
Waldo J. Kelleigh
by Roberts, Cushman & Grover
Att'ys March 10, 1959 — W. J. KELLEIGH — 2,876,882
CLUTCH ACTUATING DEVICE
Filed Sept. 16, 1954 — 2 Sheets-Sheet 2
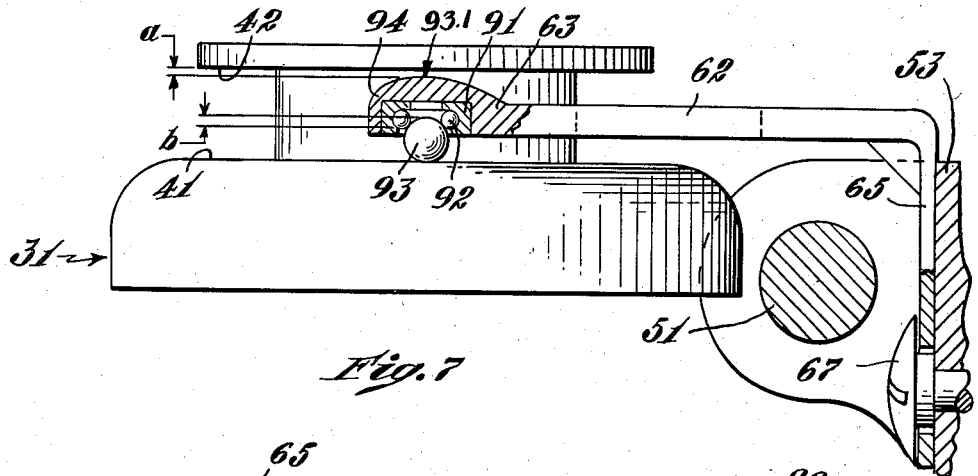
Fig. 7
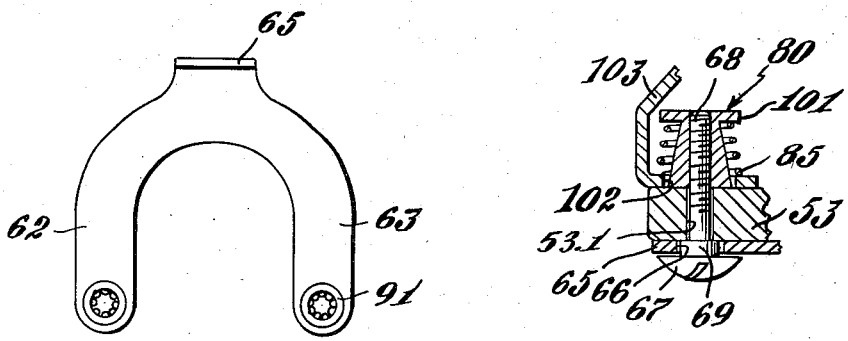
Fig. 8
Fig. 9
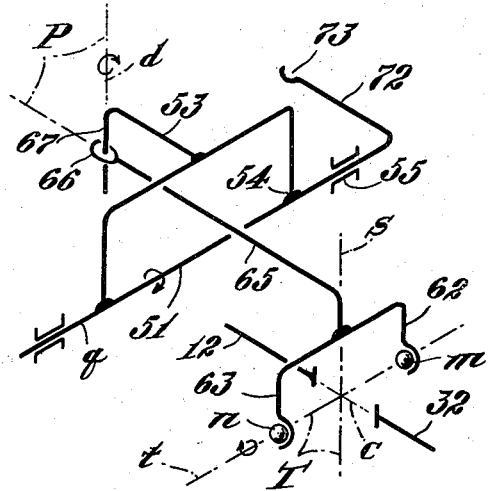
Fig. 10
Inventor
Waldo J. Kelleigh
by Roberts, Cushman & Grover
Attys United States Patent Office 2,876,882
Patented Mar. 10, 1959

2,876,882

CLUTCH ACTUATING DEVICE

Waldo J. Kelleigh, Wayland, Mass., assignor to Electrical Apparatus Company, Inc., Boston, Mass., a corporation of Massachusetts Application September 16, 1954, Serial No. 456,588

4 Claims. (Cl. 192—98)

This invention relates to devices for actuating mechanical clutches, for example, of the type described in my copending application Serial No. 102,090, filed on June 29, 1949, now Patent No. 2,690,246 of September 28, 1954.

The principal objects of the invention are to provide a clutch actuating device which is self-adjusting and does not depend on the precise alignment of driving and driven members of the clutch, which is suspended with essentially universal movement, which has equal wear at the force transmitting points, which introduces a minimum amount of friction into the moving clutch system, which is simple and does not require lengthy or intricate assembly operations, and which is nevertheless exact and reliable in operation.

The following brief summary of the invention indicates the principal aspects of its nature and substance, for attaining its above-stated objects.

In one of the aspects of the invention, an actuating device for axially moving relatively to each other the driving and driven members of a clutch, one of which members has control faces in a control plane which is transverse to clutch axis, comprises controlling means movable in a plane which includes the clutch axis, linking means pivoted on the controlling means on a link axis which intersects the clutch axis and is appreciably distanced from the control plane, and clutch shifting means fastened to the linkage means and adapted to engage one of said control faces at two pressure points which are located in a shifting axis in said control plane through the clutch axis, this actuating being self-aligning due to the eccentric swinging motion of the linking means on the link axis.

The clutch shifting means is a low friction thrust element preferably with two balls which touch the above-mentioned control face at two points in the shifting axis. In another important aspect of the invention, a low friction thrust member for insertion between the control faces comprises a retaining member, such as a fork, having a recess at each pressure point, and balls, one between each recess and a control face, the other side of the retaining member facing the other control face, and the depth of the recesses being greater than the distance of each ball from its pressure point when the ball rests in its recess, whereby the balls provide rolling thrust between the shifting means and a control face and are securely retained between recesses and face.

In a further aspect, the ball of the thrust member rests on the smaller balls of a ball bearing which is fastened to the retaining member and constitutes the above-mentioned recess.

Other objects and aspects of the invention an addition to those contained in the above summary indicating its nature and substance including some of its objects will appear from the herein presented outline of its principles and its mode of operation, together with a description of several typical embodiments illustrating its novel characteristics. These refer to drawings in which:

Fig. 1 is a front elevation of a clutch according to the above copending application, incorporating the actuating device according to the present invention;

Fig. 2 is a side elevation corresponding to Fig. 1;

Figs. 3 and 4 are sections on line 3—3 of Fig. 1, showing the actuating device according to the invention in engaging and disengaging positions, respectively;

Fig. 5 is a detailed section on lines 5—5 of Fig. 1;

Fig. 6 is a detail view of the link or fork shown in Figs. 1 to 5;

Fig. 7 is a detail, partly in section on lines 3—3 of Fig. 1, and partly in elevation, showing a modified embodiment of the thrust element for actuators of the present type;

Fig. 8 is an elevation of the actuator fork, with ball bearings according to Fig. 7;

Fig. 9 is a detail section of the link suspension also shown in Figs. 3 and 4; and Fig. 10 is a kinematic diagram of the present device.

In Figs. 1 to 4 a panel 11 or similar mounting structure supports the actuator according to the invention. At 12 is indicated a shaft with bearing means 15 which are in a suitable manner structurally associated with the panel or frame 11. One of the clutch members, for example the driven member 16, is adjustably fixed to shaft 12 by means of a threaded portion 17 of the shaft 12 which engages an inside thread of the sleeve 16 and is after adjustment fixed thereto by means of a set screw 18. As described more in detail in my above copending application, the member 16 has a groove 26 of substantially semi-circular cross-section and carries in this groove a torus 27 of yieldable material having physical characteristic comparable to those required for "class B-high flexibility" hydraulic packings, which material is extraordinarily resistant to wear, extrusion, permanent set, fatigue, cracking and disintegration. The groove 26 is so proportioned that the ring 27 becomes slightly distorted when it is slipped in place.

The movable clutch member 31 is mounted on shaft 32 by means of a bushing 32.1, pressed thereinto and preferably made of sintered metal impregnated with oil, thereby providing practically permanent lubrication. The clutch member 31 further comprises a hub 33 having at one end a flange 34 and at the other end a cup 35 forming a tapered recess 36 having a plurality of essentially radially extending serrations or teeth 37. Rotational movement between the clutch half 31 and the shaft 32 is prevented by a tapered pin pressed into an aperture of the hub (not shown) and engaging a keyway 38 of the shaft 32. As shown in Figs. 3 and 4, the two flanges 34 and 35 define two opposite surfaces or walls 41, 42 which form an annular groove for accommodating the clutch shifting mechanism.

Either shaft 12 or 32 can be driven by appropriate means; in the present example a small electric motor with gear is indicated at 50, for driving shaft 32.

The actuating gear comprises, as a controlling means, an arbor 51 journaled in bushings of two ears of panel 11, one ear being indicated at 52, and a bushing at 55. A yoke 53 is fixed to the arbor 51 with set screws 54. The yoke 53 carries, pivoted thereto, a bifurcated linking means 61 with two arms 62, 63 and, at a right angle thereto, a drawbar 65 having a hole 66 for the screw 67 with a threaded shank 68 and a shoulder 69, as indicated in Figs. 3, 4 and 9. The screw 67 is inserted into a hole 53.1 of the yoke 53 and the shank 68 engages the inside threaded portion of a spring retainer 80 serving as a nut for screw 67. The hole 66 of the drawbar 65 fits the shoulder portion 69 of the screw 67 somewhat loosely which contributes to the self-alignment and adjustment of the present clutch actuating device, as will be described in detail hereinbelow.

Adjustably fastened to arbor 51 by means of a set screw clamp 71 is a lever 72 with a hooked end 73 that engages the stirrup 74 of the armature 75 of a solenoid S mounted on frame 11, as indicated in Fig. 2. Downward movement of the armature or core 75 with stirrup 74 rotates the lever 72 in clockwise (as seen in Fig. 2) direction, rotating the arbor 51 in that direction and likewise the drawbar link 61. By means of two clutch shifting means, to be described in detail hereinbelow, attached to the ends of tines 62 and 63, the movable clutch half 31 can be moved towards the left-hand side of Figs. 2 to 4, into the engaging position shown in Figs. 2 and 3. Upward movement of the solenoid core 75 permits the lever 72 to turn counterclockwise, disengaging the moving clutch member 31, as indicated in Fig. 4.

It is often desirable to correlate an electric switching operation to the mechanical clutching operation, and means for that purpose are indicated in Figs. 1 to 4 and 9 as follows. The above-mentioned nut member 80 has an upper flange 101 and is loosely surrounded by the perforation 102 of a switch actuating finger 103 which is held against the yoke bar 53 by means of a spring 85. As indicated in Figs. 1 and 2, the upper portion of the finger 83 can be used to operate suitable electrical control means of appropriate dimensions and power requirements, such as, for example, a so-called microswitch M. The yielding engagement between finger 103 and yoke 53 provides an adjustable time lag between clutch engagement and switch operation, and permits overtravel and hence prolonging the life of the switch.

One embodiment of the above-mentioned clutch shifting member is shown in detail in Fig. 5, which indicates the tines 62 and 63 that are also shown in Fig. 6. These tines 62 and 63 have cup-shaped depressions 81, 82 holding steel balls 83, 84 which rest on the opposite side on the face 41 of the grove or flange 35 of the movable clutch member 31. As indicated in Fig. 5, the distance $a$ between the outside 81.1 and 82.1 of the cups 81, 82 and the face 42 is less than the depth $b$ of the cups. It will be understood that, when neither face is touched, the dimension $a$ will be composed of the distance between the outer cup tip and face 42, plus the distance between the apex point of the ball and the surface 41. This dimensional relation prevents the ball from escaping between the cup and the face 41. With the device in the position of Fig. 3, the balls exert the required shifting and clutch holding thrust with very little friction, and defining two points of adjustment $m$ and $n$.

Another embodiment of the thrust member is shown in Figs. 7 and 8. This is especially suited for fairly heavy constructions requiring an appreciable thrust force for keeping the clutch members in engagement. This device consists of a self-retaining ball bearing having a race 91 and small balls 92, engaging a large ball 93 which corresponds to balls 83, 84 of Fig. 5. The bearing 91 is pressed into a recess of the tines 62, 63, the rear faces 93.1 of the tines being rounded, as indicated at 94, in order to prevent catching at face 42. The critical dimensions $a$ and $b$ are indicated as in Fig. 5, and it will be noted that dimension $b$ is in this instance defined by the distance between the inner apex of ball 93 and the outer apices of balls 92.

The kinematic properties of the present device are schematically indicated in Fig. 10 which carries the labels of the essential elements of Figs. 1 to 9, and, in addition, the characteristic geometrical features, as follows. The above-mentioned thrust points $m$ and $n$ define a thrust axis $t$ which defines, with the shifting axis $s$, the control plane T, which is approximately normal to the clutch or transmission axis $c$. The screw 67 defines the important link or drawbar axis $d$. The control means defined by yoke 53 move in a shifting plane P through the transmission axis $c$. The bearings 55 define an actuator axis $q$.

The above-described device operates as follows, reference being particularly had to Figs. 3, 4, 7, 8 and 10. Fig. 7 corresponds kinematically to Fig. 3, both showing the device in clutch engaging position, whereas Fig. 4 indicates the disengaged position.

As indicated in Fig. 10, the link or drawbar axis $d$ is eccentric relatively to the shifting axis $s$, outside of the control plane T. It will be evident from Fig. 10 that the engagement at $m$, $n$ of the balls with the groove face of the movable clutch member is self-aligning, due to the swinging movement of the drawbar 65 on the eccentric axis $d$ and its rotation on axes $c$ and $t$, made possible by the above mentioned somewhat loose contact at hole 66 and shoulder 69 as clearly indicated in Fig. 9. Thus, the two thrust points $m$, $n$ can align and adjust themselves, and equally distribute the thrust force between them, by vertical as well as horizontal rotation. The movement on axis $d$ can be compared to that of the drawbar hitch between a tractor and its trailer, in the present instance assuring equal pressure at both thrust points, self-alignment and absence of binding within the groove of the moving clutch member. The clutch member 31 floats freely on the balls 83, 84 or 93, 94 and can thus assume proper alignment in all positions of the rotating ring 27 and of its actuating mechanism.

It will be noted that in operative position the yoke 53 is tilted, as shown in Fig. 4, with the solenoid core extending from the coil. Upon energization of the solenoid, which, of course, could be replaced by a mechanical actuating means, arm 72 is moved downwardly and the yoke 53 swings into the position of Fig. 3, pressing the movable clutch member 31 against the O-ring 27, engagement taking place as described in the above-mentioned copending application. As explained above with reference to Figs. 5 and 7, the low friction thrust members are permanently confined between faces 41 and 42. It will be evident that thrust members according to Figs. 7 and 8 are useful within combinations other than that described above, wherever a similar function is required.

It should be understood that the present disclosure is for the purpose of illustration only and that this invention includes all modifications and equivalents which fall within the scope of the appended claims.

I claim:

1. An actuating device for moving relatively to each other the driving member and the driven member of a clutch which members are supported on a frame means for rotation on respective shaft means defining a transmission axis, one of said members having a circular groove with faces extending transverse of said transmission axis, comprising: an actuator yoke adapted to be pivotally mounted on said frame means for rotation on an actuator axis which is axially spaced from and transverse to said transmission axis, said yoke having pivot means extending transversely of and spaced from said actuator axis; a link including a draw bar, and a shifting fork; means for loosely pivoting the draw bar on said pivot means, said shifting fork extending angularly with respect to said draw bar and having tines adapted to straddle said groove; and means on each tine for contacting said groove face at two pressure points on a thrust axis parallel to said faces and spaced from said actuator axis; whereby the link is self-aligning during movement of the yoke due to its loose pivotal connection on the yoke during movement of the yoke.

2. An actuating device for moving relatively to each other the driving member and the driven member of a clutch which members are supported on frame means for rotation on respective shaft means defining a transmission axis, one of said members having a circular groove with faces extending transverse of said transmission axis, comprising: an actuator yoke adapted to be pivotally mounted on said frame means for rotation on an actuator axis which is axially spaced from and transverse to said transmission axis, said yoke having a flat transverse portion and a pivot stud having a head extending therefrom towards said shaft means; a link including a draw bar and a shifting fork, and at the end of said draw bar a flat portion having a hole which loosely engages said stud such that the flat portion can slightly move longitudinally and laterally on said stud, said shifting fork extending angularly with respect to said draw bar and having tines adapted to straddle said groove; and means on each tine for contacting said groove face at two pressure points on a thrust axis parallel to said faces and spaced from said actuator axis; whereby the link is self-aligning during movement of the yoke due to its loose pivotal connection on the yoke during movement of the yoke.

3. In combination: a member mounted on an axis for movement therealong and having two walls substantially transverse to said axis facing each other to form a groove; a shifting member adapted to move longitudinally of said axis between said walls, and having a contact surface means facing one wall and a recess facing the other wall; a thrust ball having a first portion within said recess and a second portion extending beyond the rim of said recess; the thickness of the extension of said ball beyond said rim and the thickness of said shifting member being smaller than the distance between said walls when the ball presses against said other wall, and the thickness of the parts as defined by the diameter of said ball and the thickness of the shifting member being greater than the distance between said walls; whereby said ball provides low friction rolling thrust against its adjacent wall and is securely retained in said recess.

4. Device according to claim 3, further comprising a thrust ball bearing mounted in said recess between the shifting member and the thrust ball to provide rolling contact between said shifting member and said ball.

References Cited in the file of this patent

UNITED STATES PATENTS

| | | |
|---|---|---|
| 728,499 | Reuter | May 19, 1903 |
| 776,404 | Keyser | Nov. 29, 1904 |
| 1,473,801 | White et al. | Nov. 13, 1923 |
| 1,539,299 | Cheney | May 26, 1925 |
| 2,157,429 | Padden | May 9, 1939 |
| 2,183,401 | Judelshon | Dec. 12, 1939 |
| 2,374,542 | Hausman | Apr. 24, 1945 |

FOREIGN PATENTS

| | | |
|---|---|---|
| 806,993 | France | Oct. 5, 1936 |
| 883,535 | Germany | July 20, 1953 |